(12) United States Patent
Nakagawa et al.

(10) Patent No.: US 6,586,090 B2
(45) Date of Patent: Jul. 1, 2003

(54) ADHESIVE TAPE AND SUBSTRATE FOR ADHESIVE TAPE

(75) Inventors: Yoshio Nakagawa, Ibaraki (JP); Shigeki Ishiguro, Ibaraki (JP); Masayoshi Natsume, Ibaraki (JP); Shinichi Takada, Ibaraki (JP); Kooki Ooyama, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/791,921

(22) Filed: Feb. 22, 2001

(65) Prior Publication Data

US 2001/0031355 A1 Oct. 18, 2001

(30) Foreign Application Priority Data

Feb. 24, 2000 (JP) ........................................ 2000-047332
Sep. 22, 2000 (JP) ........................................ 2000-288673

(51) Int. Cl.$^7$ ............................................... B32B 27/32
(52) U.S. Cl. ................................. 428/355 EN; 428/327; 428/330; 428/343
(58) Field of Search ................................ 428/327, 330, 428/343, 355 EN (56) References Cited

U.S. PATENT DOCUMENTS

| 4,067,847 A | 1/1978 | Yui et al. |
| 5,498,476 A | 3/1996 | Tucker et al. |

FOREIGN PATENT DOCUMENTS

| JP | 60 97509 | 5/1985 |
| JP | 60 97510 | 5/1985 |
| JP | 62 135545 | 6/1987 |
| JP | 63 37509 | 2/1988 |
| JP | 63 43205 | 2/1988 |
| JP | 63 43207 | 2/1988 |
| JP | 02 038434 | 2/1990 |
| JP | 05-047249 | 2/1993 |
| JP | 05-194915 | 8/1993 |
| JP | 2000-169799 | 6/2000 |
| WO | WO 97/05206 | 2/1997 |

OTHER PUBLICATIONS

Machine Translation of JP–05047249 obtained from http://www.ipdl.jpo.go.jp/homepg_e.ipdl, Feb. 26, 1993.*
Database WPI, Section Ch, Derwent Publications Ltd., London, GB; Class A81, AN 1994–040109, XP–002187793 (1994) [JP 05 345881 A (Dec. 27, 1993)].

* cited by examiner

Primary Examiner—Robert Dawson
Assistant Examiner—Christopher Keehan
(74) Attorney, Agent, or Firm—Leydig, Voit & Mayer, Ltd.

(57) ABSTRACT

The present invention provides an adhesive tape comprising a substrate and an adhesive layer formed on at least one side of the substrate, wherein the substrate comprises the following Component A, Component B and Component C:

Component A: a thermoplastic resin having a carbonyl oxygen atom in the molecular skeleton

Component B: a polymer alloy containing an ethylene component and a propylene component Component C: an inorganic metal compound surface-treated with a silane coupling agent but substantially no halogen atom. The adhesive tape and the substrate for the adhesive tape of the present invention are free of generation of dioxin or a toxic gas upon incineration, are superior in flexibility, resistance to thermal deformation, flame resistance and resistance to surface whitening, and show suitable stretchability and mechanical strength.

12 Claims, 2 Drawing Sheets

ADHESIVE TAPE AND SUBSTRATE FOR ADHESIVE TAPE

TECHNICAL FIELD OF THE INVENTION

The present invention relates to an adhesive tape free of generation of dioxin or a toxic gas upon incineration, which is superior in flexibility, resistance to thermal deformation, flame resistance and resistance to surface whitening, and which has suitable stretchability and mechanical strength, and to a substrate for the adhesive tape.

BACKGROUND OF THE INVENTION

A conventional adhesive tape comprising a substrate for an adhesive tape (hereinafter to be also referred to simply as a substrate), which is made from polyvinyl chloride (hereinafter to be abbreviated as PVC), is superior in mechanical properties (particularly flexibility and stretchability), flame resistance, resistance to thermal deformation, electrical insulation property, forming processability and the like. Combined with its beneficial economical aspect, the above-mentioned tape has been widely used as an insulating tape for electric equipment used in the fields of vehicles, such as automobile, train, bus and the like, aircraft, ship, house, plant and the like. Particularly, an adhesive tape to be wound around a wire harness to be used for electric wires in automobile and the like, a coil for household electric appliances, an electric wire and the like, is required to show high flame resistance (oxygen index of not less than 25%), high resistance to thermal deformation (heat deformation rate of 65% or less at 100° C., 4.90N load), and, from the aspect of workability during tape winding around an object to be adhered to, suitable stretchability and suitable mechanical strength, that enable winding of a tape while stretching it with ease without breakage of the tape, and, after winding, cutting of the tape easily with hand (hereinafter to be also referred to as hand cutting property). To meet these requirements, an adhesive tape using PVC as a substrate has been widely used.

Given the recent rise of consciousness toward environmental problems, however, there is a movement to reduce use of PVC and replace it with a material causing less environmental burden. This is because PVC is suspected of generating dioxin and toxic gas, such as chlorine gas, upon incineration. To replace PVC, the use of a polyolefin resin as a substrate has been considered, because it less likely generates dioxin or a toxic gas, such as chlorine gas, upon incineration. However, polyolefin resins easily burn as compared to PVC and require addition of a flame retardant. In general, inorganic metal compounds such as metal hydroxides causing less environmental burden (e.g., magnesium hydroxide, aluminum hydroxide etc.) and the like are added as inorganic flame retarders.

When a substrate is obtained by adding an inorganic flame retardant to a polyolefin resin, polypropylene, ethylene-propylene copolymer, high density polyethylene and the like, having a relatively high melting point, are not suitable as the polyolefin resin to which the inorganic flame retardant is to be added, in consideration of the flexibility and stretchability necessary for an adhesive tape. Instead, a polyolefin resin having a low melting point is preferably used, such as low density polyethylene, linear low density polyethylene, ultra-low density polyethylene, middle density polyethylene, ethylene-vinyl acetate copolymer, ethylene-ethyl acrylate copolymer and the like. However, because these low melting point polyolefin resins are easily deformed by heat, and because they stretch too much, even if they are certainly flexible, an adhesive tape using a low melting point polyolefin resin as a substrate shows poor resistance to thermal deformation and hand cutting property.

As a method for improving resistance to thermal deformation of a resin film, there have been known a method comprising exposing the film to ionizing radiation, a method comprising previous addition of a crosslinking agent, such as organic peroxide (e.g., dicumylperoxide), to a resin and vapor heating of a film after forming to provide a crosslinking structure in the film, and the like. These methods also increase the number of production steps and production cost to the level that makes their practical use unfeasible.

A different method comprises the use of a mechanically blended polymer mixture of polypropylene, ethylene-propylene copolymer, high density polyethylene and the like, having a relatively high melting point, and an elastomer consisting of ethylene copolymer, such as EPM (ethylene-propylene rubber), EBR (ethylene-butene rubber), EPDM (ethylene-propylene-diene copolymer rubber) and the like. When a flame retardant is added to this polymer mixture, a molded product thereof becomes very stiff and lacks flexibility at room temperature, making stretchability strikingly low and resistance to thermal deformation insufficient.

For sufficient flame resistance to be achieved, an inorganic flame retarder needs to be added in a comparatively large amount to the polyolefin resin. The addition of the comparatively large amount of the inorganic flame retarder results in poor stretchability of the substrate and reduced mechanical strength (particularly strength at break). The addition of the inorganic flame retarder also causes whitening of the surface of a substrate when it is brought into contact with an object or when it is stretched. The whitening of the surface of the substrate not only impairs the appearance of the product obtained by winding an adhesive tape but also degrades the insulating property and mechanical property of the adhesive tape. Therefore, there is a strong demand for an improvement.

When an inorganic metal compound surface-treated with oleic acid, stearic acid or sodium salt etc. of these is used as a flame retarder, the inorganic metal compound has an improved dispersibility in a polyolefin resin, thereby reducing the amount of the inorganic metal compound necessary for producing sufficient flame resistance, as a result of which the mechanical property of the substrate can be improved. This attempt can improve the stretchability of the substrate somewhat but is ineffective for the prevention of the degradation of the mechanical strength (strength at break) of the substrate and whitening of the surface of the substrate.

It is therefore an object of the present invention to provide an adhesive tape free of generation of dioxin or a toxic gas upon incineration, which is superior in flexibility, resistance to thermal deformation, flame resistance and resistance to surface whitening, and which has suitable stretchability and mechanical strength, as well as a substrate to be used for this adhesive tape.

SUMMARY OF THE INVENTION

According to the present invention, (i) a thermoplastic resin having a carbonyl oxygen atom in the molecular skeleton, (ii) a polymer alloy containing an ethylene component and a propylene component, and (iii) an inorganic metal compound surface-treated with a silane coupling agent in combination, are used as components to constitute the substrate of an adhesive tape, and the substrate is made to be substantially free of halogen atom. As a result, a substrate for an adhesive tape can be obtained, which is free of generation of dioxin or a toxic gas upon incineration and whitening of the surface upon contact with other objects and upon stretching, and which is superior in flexibility, resistance to thermal deformation and flame resistance, and has suitable stretchability and mechanical strength that afford fine winding workability and hand cutting property of the adhesive tape.

Accordingly, the present invention provides an adhesive tape comprising a substrate and an adhesive layer formed on at least one side of the substrate, wherein the substrate comprises the following Component A, Component B and Component C but substantially no halogen atom:

Component A: a thermoplastic resin having a carbonyl oxygen atom in the molecular skeleton Component B: a polymer alloy containing an ethylene component and a propylene component Component C: an inorganic metal compound surface-treated with a silane coupling agent.

The preferable embodiments are as follows.

The Component B has a dynamic storage modulus (E') at 80° C. of not less than 40 MPa and less than 180 MPa, and a dynamic storage modulus (E') at 120° C. of not less than 12 MPa and less than 70 MPa.

The Component B has a dynamic storage modulus (E') at 23° C. of not less than 200 MPa and less than 400 MPa.

The Component A is an ethylene copolymer or a metal salt thereof, having a melting point of not more than 120° C., which is obtained by polymerizing a vinyl ester compound, or an α,β-unsaturated carboxylic acid or a derivative thereof, or the vinyl ester compound and the α,β-unsaturated carboxylic acid or a derivative thereof.

The Component C is an inorganic metal compound surface-treated with 0.1–5.0 wt % silane coupling agent per the weight of the inorganic metal compound.

The Component A and the Component B are mixed at a weight ratio (A:B) of 1:9–8:2, and the Component C is added in an amount of 80–200 parts by weight per 100 parts by weight of the total weight of the Component A and the Component B.

The adhesive tape has a dynamic storage modulus (E') at 80° C. of not less than 25 MPa and a dynamic storage modulus (E') at 120° C. of not less than 10 MPa.

The substrate has a dynamic storage modulus (E') at 80° C. of not less than 25 MPa and a dynamic storage modulus (E') at 120° C. of not less than 10 MPa.

The substrate is not crosslinked during or after a forming process thereof.

BRIEF DESCRIPTION OF THE DRAWINGS

FIG. 1(a) and FIG. 1(b) show a method for the evaluation of thermal deformation of an adhesive tape (substrate), wherein

FIG. 2 is a scanning electron microscopic photograph showing the state of the surface of the substrate after stretching, wherein

DETAILED DESCRIPTION OF THE INVENTION

The adhesive tape of the present invention comprises a substrate and an adhesive layer formed on at least one side of the substrate, wherein the substrate comprises the following Component A, Component B and Component C but substantially no halogen atom:

Component A: a thermoplastic resin having a carbonyl oxygen atom in the molecular skeleton Component B: a polymer alloy containing an ethylene component and a propylene component Component C: an inorganic metal compound surface-treated with a silane coupling agent.

As used herein, by the "substantially no halogen atom" is meant non-use of a substance having a halogen atom in a molecule as a material of the substrate. However, a halogen atom detected in an ultra-trace amount by analysis of the composition of a substrate using mechanical analysis means is excluded. For example, a halogen atom may be contained in an ultra-trace amount in the substrate, due to the use of a halogen-containing substance as a catalyst for the synthesis of a constituting material.

The thermoplastic resin having a carbonyl oxygen atom (oxygen atom attributable to carbonyl) in the molecular skeleton of Component A mainly imparts appropriate flexibility and stretchability to a substrate (adhesive tape). In addition, carbonic oxygen atom in the molecular skeleton further activates a flame resistance-imparting action of the inorganic flame retarder (Component C, inorganic metal compound surface-treated with a silane coupling agent). When Component A and Component C co-exist, a strong interface bonding force is created between the two Components, which in turn improves the mechanical property of the substrate (adhesive tape). This has a consequence that suitable stretchability and mechanical strength that afford fine winding workability and suitable hand cutting property of the adhesive tape can be achieved, and that the whitening of the surface can be suppressed. Such beneficial effects cannot be obtained even if Component C is concurrently used with a thermoplastic resin without carbonic oxygen atom in the molecular skeleton, such as polyethylene and polypropylene.

As component A, a soft polyolefin resin having a carbonyl oxygen atom in the molecular skeleton is preferable. The soft polyolefin resin having a carbonyl oxygen atom in the molecular skeleton may be an ethylene copolymer or a metal salt thereof (particularly ionomer) comprising a vinyl ester compound and/or an α,β-unsaturated carboxylic acid or a derivative thereof as a monomer or a comonomer. In general, it has a melting point of not more than 120° C., preferably 40–100° C. The melting point is measured by a differential scanning calorimeter (DSC).

In the above-mentioned ethylene copolymer or a metal salt thereof (particularly ionomer), the vinyl ester compound may be, for example, lower alkyl ester of vinyl alcohol such as vinyl acetate and the like. The α,β-unsaturated carboxylic acid or a derivative thereof may be, for example, unsaturated carboxylic acids and anhydrides thereof, such as acrylic acid, methacrylic acid, maleic acid, fumaric acid, maleic anhydride, itaconic anhydride and the like; unsaturated carboxylates such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, stearyl acrylate, stearyl methacrylate, lauryl acrylate, lauryl methacrylate, monomethyl maleate, monoethyl maleate, diethyl maleate, monomethyl fumarate, glycidyl acrylate and glycidyl methacrylate; and the like. Of these, alkyl (meth)acrylate, particularly ethyl acrylate, is preferable.

Examples of suitable ethylene copolymer or a metal salt thereof (particularly ionomer) include ethylene-acrylic acid copolymer, ethylene-methacrylic acid copolymer, ethylene-ethyl acrylate copolymer, ethylene-acrylic acid-ethyl acrylate copolymer, ethylene-vinyl acetate copolymer, ethylene-vinyl acetate-ethyl acrylate copolymer, ethylene-glycidyl methacrylate copolymer, ethylene-glycidyl methacrylate-ethyl acrylate copolymer and metal salts thereof (particularly ionomers) and the like, which may be used alone or in combination.

The polymer alloy containing an ethylene component and a propylene component of Component B mainly suppresses thermal deformation of a substrate (adhesive tape). By making an alloy of an ethylene component and a propylene component, the polymer alloy shows viscoelasticity suitable for suppressing thermal deformation of particularly a substrate (adhesive tape).

The constitution (form) of the polymer alloy is not particularly limited. For example, various constitutions (forms) are acceptable such as (1) a polymer blend (physical mixture) of two or more kinds of polymers physically mixed, (2) a block copolymer or graft copolymer wherein two or more kinds of polymers are bonded by a covalent bond, and (3) an IPN (Interpenetrating Polymer Network) structure wherein two or more kinds of polymers are intertwined without a covalent bond.

The polymer alloy may not be homogeneous in composition but may have a distribution. In addition, it may be an alloy of two or more kinds of compatible polymers or a phase separation structure formed by two or more kinds of incompatible polymers. It may have a thermal property showing plural exothermic or endothermic peaks by DSC measurement.

Examples of the polymer alloy containing an ethylene component and a propylene component of Component B include a physical mixture of polypropylene (homo polypropylene, random polypropylene) and polyethylene (inclusive of copolymer of ethylene and a small amount of other α-olefin), propylene/ethylene copolymer (block copolymer or graft copolymer), terpolymer of propylene, ethylene and α-olefin other than these, and the like. As used herein, by the above-mentioned other α-olefin is meant 1-butene, 1-penten, 1-hexene, 4-methyl-1-pentene, 1-heptene, 1-octene and the like, with preference given to 1-butene. By the homo polypropylene is meant a polymer comprising substantially 100% of propylene and by the random polypropylene is meant a copolymer comprising several percent of ethylene randomly copolymerized.

When the polymer alloy is a copolymer, a copolymer obtained by multi-step polymerization involving two or more steps is preferable, with preference given to a propylene/ethylene copolymer. The copolymer obtained by multi-step polymerization involving two or more steps can be obtained by, as disclosed in JP-A-4-224809, for example, preliminarily polymerizing propylene or propylene and α-olefin other than propylene in the presence of a titanium compound and an organic aluminum compound as catalysts in the first step of the multi-step polymerization, and then copolymerizing propylene and ethylene (after addition of α-olefin other than propylene and ethylene as necessary) in the presence of the produced titanium-containing polyolefin and an organic aluminum compound in the second step or a subsequent step. As a result, the obtained copolymer is a blend of a polymer produced in the first step [e.g., polypropylene (homopolymer of propylene), propylene-α-olefin copolymer and the like] and a polymer produced in the second step or a subsequent step (e.g., propylene-ethylene copolymer, propylene-ethylene-other α-olefin copolymer, and the like), which are blended to a molecular level in the second step or a subsequent step. The above-mentioned titanium compound is, for example, a solid catalyst having an average particle size of 15 μm and is obtained by pulverizing titanium trichloride and magnesium chloride together, and treating with n-butyl orthotitanate, 2-ethylhexanol, ethyl p-toluate, silicon tetrachloride, diisobutyl phthalate and the like. The organic aluminum compound may be, for example, alkyl aluminum such as triethyl aluminum and the like. In a polymerized phase, a silicon compound such as diphenyldimethoxysilane and the like or an iodine compound such as ethyl iodide may be contained as an electron donor.

The polymer alloy containing an ethylene component and a propylene component of Component B preferably shows high elasticity under high temperature, that is, in consideration of the temperature during use of the adhesive tape, it preferably shows a dynamic storage modulus (E') at 80° C. of not less than 40 MPa and less than 180 MPa (preferably within the range of 45–160 MPa) and a dynamic storage modulus (E') at 120° C. of not less than 12 MPa and less than 70 MPa (preferably within the range of preferably 15–65 MPa). The above-mentioned dynamic storage modulus (E') sufficiently suppresses thermal deformation of a substrate (adhesive tape).

The dynamic storage modulus (E') here is measured in the following manner. That is, a polymer alloy test piece (thickness 0.2 mm: width 10 mm, length 20 mm) is prepared, and the dynamic viscoelastic behavior of this test piece at dispersed temperatures is measured with DMS6000 (trademark, manufactured by Seiko Instruments) as a measurement apparatus under the measurement conditions of method: extension mode, temperature rise: 2° C./min, frequency: 1 Hz.

Examples of the polymer alloy showing such dynamic storage modulus (E') include trademarks CATALLOY KS-353P, CATALLOY KS-021P and CATALLOY C200F manufactured by Montell SKD Sunrise Ltd., and the like.

The polymer alloy of Component B preferably shows a dynamic storage modulus (E') at 23° C. of not less than 200 MPa and less than 400 MPa in consideration of the workability of the adhesive tape at near room temperature (followability of the adhesive tape to the object to be adhered to). The dynamic storage modulus (E') of this range of the polymer alloy of Component B leads to fine flexibility of the substrate (adhesive tape), and therefore, improved followability to the object to be adhered to. The dynamic storage modulus (E') here is measured by the aforementioned method. Examples of the polymer alloy having such dynamic storage modulus (E') include trademarks CATALLOY KS-353P, CATALLOY KS-021P and CATALLOY C200F manufactured by Montell SKD Sunrise Ltd., and the like.

Component A and Component B are mixed at a weight ratio (A:B) of generally 1:9–8:2, preferably 2:8–6:4. When the weight ratio is outside this range and Component A is used in a smaller amount (Component B is in a greater amount), the substrate (adhesive tape) may be poor in flexibility, stretchability and flame resistance. When Component A is used in a greater amount (Component B is in a smaller amount), the substrate (adhesive tape) may show poor resistance to thermal deformation.

In the present invention, an inorganic metal compound surface-treated with a silane coupling agent (Component C) is used as the inorganic flame retarder. Such inorganic flame retarder provides a strong interface bonding force between the Component C and Component A (thermoplastic resin having a carbonyl oxygen atom in the molecular skeleton), which in turn improves mechanical property of the substrate (adhesive tape). As a result, suitable stretchability and suitable mechanical strength, that afford fine winding workability and hand cutting property of the adhesive tape, can be obtained, and the whitening of the surface can be suppressed. Such effect cannot be obtained with an inorganic metal compound not surface-treated with a silane coupling agent.

The inorganic metal compound surface-treated with a silane coupling agent of Component C is the same known inorganic metal compound used as an inorganic flame retardant except for the surface treatment with a silane coupling agent. Examples of the known inorganic metal compound include metal hydroxide such as aluminum hydroxide, magnesium hydroxide, zirconium hydroxide, calcium hydroxide, barium hydroxide and the like; metal carbonate such as basic magnesium carbonate, dolomite and the like; metal hydrate (hydrate of metal compound) such as hydrotalcite, borax and the like; and the like. The inorganic metal compound surface-treated with a silane coupling agent may be used alone or in combination. Of these, one selected from the group of magnesium hydroxide, aluminum hydroxide, basic magnesium carbonate and hydrotalcite, all surface-treated with a silane coupling agent, is advantageous in view of flame resistance-imparting effect and economical aspect. The inorganic metal compound has an average particle size of generally about 0.1–50 $\mu$m, preferably 0.5–20 $\mu$m. The particle size here is measured by a laser diffraction method.

The silane coupling agent has a hydrolyzable group bonded to silicon atom, which group having affinity for or being reactive with an inorganic material, and an organic functional group having affinity for or being reactive with an organic resin. Examples of the hydrolyzable group bonded to silicon atom include alkoxyl, acetoxy and the like. Examples of the alkoxyl include that having 1 or 2 carbon atoms, such as methoxy and ethoxy. Examples of the organic functional group include amino, methacryl, vinyl, epoxy, mercapto and the like.

Examples of the silane coupling agent include vinyltriethoxysilane, vinyl-tris(2-methoxyethoxy)silane, $\gamma$-methacryloxypropyltrimethoxysilane, $\gamma$-aminopropyltrimethoxysilane, $\gamma$-aminopropyltriethoxysilane, N-phenyl-$\gamma$-aminopropyltrimethoxysilane, N-$\beta$-(aminoethyl)-$\gamma$-aminopropyltrimethoxysilane, N-$\beta$-(aminoethyl)-$\gamma$-aminopropyltriethoxysilane, N-phenyl-$\gamma$-aminopropyltriethoxysilane, $\beta$-(3,4-epoxycyclohexyl) ethyltrimethoxysilane, $\gamma$-glycidoxypropyltrimethoxysilane, $\gamma$-mercaptopropyltrimethoxysilane and the like, which may be used alone or in combination.

The method for the surface treatment of an inorganic metal compound with the silane coupling agent is not particularly limited. A typical method such as dry treatment, wet treatment and the like can be used.

The amount of the surface-treatment of an inorganic metal compound with the silane coupling agent varies depending on the kind of the silane coupling agent, the kind of the inorganic metal compound and specific surface area. It is generally 0.1–5.0 wt %, preferably 0.3–3.0 wt %, per the weight of the inorganic metal compound.

The Component C is added in an amount of generally 80–200 parts by weight, preferably 100–170 parts by weight, per 100 parts by weight of the total amount of Component A and Component B. When the amount added of Component C is outside this range and is smaller, sufficient flame resistance cannot be imparted to the substrate (adhesive tape). When it is greater, the substrate (adhesive tape) may become poor in flexibility and stretchability.

It is also possible to concurrently use a char (carbonated layer)-forming aid for the inorganic flame retarder, along with Component C. The char-forming aid is preferably at least one member selected from carbon black, borates and silicone compounds (silicone oil, silicone rubber, silicone resin and the like) to secure a more preferable effect. The char-forming aid is added in an amount of generally 0.5–10 wt %, preferably 1–5 wt %, per 100 parts by weight of the total amount of Component A and Component B.

According to the present invention, the substrate is generally obtained by dry blending Component A, Component B and Component C, kneading the mixture in a Banbury mixer, a roller, an extruder and the like, and forming the kneaded mixture into a film by a known forming method such as compression forming, calendar forming, injection forming, extrusion forming and the like.

The substrate (film) has a thickness of generally 0.01–1 mm, preferably 0.05–0.5 mm, though subject to change depending on the use of the adhesive tape.

In the present invention, an inorganic filler such as titanium oxide, zinc oxide and the like, an age resister and antioxidant such as amine type, quinoline type, hydroquinone type, phenol type, phosphorous type and phosphite type age resisters and the like, an ultraviolet absorber such as salicylic acid derivative, benzophenone type, benzotriazole type and hindered amine type ultraviolet absorbers and the like, a lubricant such as aliphatic acid amides (e.g., amides such as aliphatic acid monoamaide, unsaturated aliphatic acid amaide etc., substituted amides and methylol amides), aliphatic ester amides, polyethylene wax and the like, a plasticizer and the like may be added where necessary. These are dry blended with the elements of the above-mentioned Component A, Component B and Component C and subjected to film forming.

In the present invention, it is preferable that the substrate not undergo a crosslinking treatment comprising an ionizing radiation such as electron beam, $\beta$-ray, $\gamma$-ray and the like, after film forming, or a crosslinking treatment comprising addition, during forming process, of a crosslinking agent, such as organic peroxide and the like, or a crosslinking auxiliary to the material to be formed. In other words, the whole substrate is preferably free of crosslinking structure.

The adhesive tape of the present invention is produced by forming an adhesive layer at least on one side of the above-mentioned substrate. Examples of the adhesive include any adhesive, such as rubber type, hot melt type, acrylic type and emulsion type adhesives, which is currently in use. Examples of preferable base polymer of the rubber and hot melt adhesives include natural rubber, regenerated rubber, silicone rubber, isoprene rubber, styrene-butadiene rubber, polyisoprene, NBR, styrene-isoprene copolymer, styrene-isoprene-butadiene copolymer and the like.

Examples of the tackifier to be used for adhesive include rosin tackifier, terpene tackifier, aliphatic petroleum hydrocarbon (C5) tackifier, aliphatic petroleum hydrocarbon (C9) tackifier, hydrogenated compound and the like. It is also possible to add an additive usually added to the adhesive for an adhesive tape, such as oil, wax, antioxidant and the like in an amount determined by a conventional method.

Of the aforementioned adhesives, an acrylic adhesive is preferable. Examples thereof include homopolymer of (meth)acrylate or a copolymer thereof with a copolymerizable monomer. Examples of (meth)acrylate and the copolymerizable monomer include alkyl (meth)acrylate (e.g., methyl ester, ethyl ester, butyl ester, 2-ethylhexyl ester, octyl ester and the like), glycidyl (meth)acrylate, (meth)acrylic acid, itaconic acid, maleic anhydride, (meth)acrylamide, (meth)acrylic N-hydroxyamide, alkylaminoalkyl (meth) acrylate (e.g., dimethylaminoethyl methacrylate, t-butylaminoethyl methacrylate and the like), vinyl acetate, styrene, acrylonitrile and the like. Of these, the main monomer is preferably alkyl acrylate wherein its homopolymer (single polymer) generally has a glass transition temperature of not more than −50° C.

The adhesive is applied by a conventionally-known method such as cast method, roll coater method, reverse coater method, doctor blade method and the like.

The adhesive layer has a thickness (thickness after drying) that varies depending on the use of the adhesive tape, which is generally 10–50 μm, preferably 15–40 μm.

In the present invention, the adhesive tape preferably has a dynamic storage modulus (E') at 80° C. of not less than 25 MPa and a dynamic storage modulus (E') at 120° C. of not less than 10 MPa. Such dynamic storage moduli make the adhesive tape less likely suffer from thermal deformation. In view of the suitable flexibility and stretchability necessary for an adhesive tape, the dynamic storage modulus (E') at 80° C. is preferably not more than 200 MPa, and the dynamic storage modulus (E') at 120° C. is preferably not more than 150 MPa.

The dynamic storage modulus (E') here of the adhesive tape is measured in the following manner. That is, a test piece (width 10 mm, length 20 mm) is taken from an adhesive tape comprising a substrate (thickness 0.2 mm) and an adhesive layer formed thereon, and the dynamic viscoelastic behavior of this test piece at dispersed temperatures is measured with DMS6000 (trademark, manufactured by Seiko Instruments) as a measurement apparatus under the measurement conditions of method: extension mode, temperature rise: 2° C./min, frequency: 1 Hz.

The dynamic storage modulus (E') of the adhesive tape is free from an effect of the adhesive layer. That is, the presence of an adhesive layer does not change the value of the dynamic storage modulus (E'), and the dynamic storage modulus of the adhesive tape (E') is substantially that of the substrate.

In the present invention, an adhesive tape (substrate) having "a dynamic storage modulus (E') at 80° C. of not less than 25 MPa and a dynamic storage modulus (E') at 120° C. of not less than 10 MPa" can be obtained by using the above-mentioned Component A, Component B and Component C as components to constitute the substrate, by appropriately determining the kind, mixing weight ratio, combination and the like of Component A, Component B and Component C, by using Component B having a specific dynamic storage modulus (E'), by using Component A having a specific melting point, and the like.

The present invention is explained in detail in the following by referring to Examples and Comparative Examples. The present invention is not limited by these examples.
Materials Used
Component A (Thermoplastic Resin Having a Carbonyl Oxygen Atom in the Molecular Skeleton)
  A1: ethylene-vinyl acetate copolymer (EVA), melting point 84° C.(trademark: EVAFLEX P-1905, Du Pont-Mitsui Polychemicals Company, Ltd.)
  A2: ethylene-vinyl acetate copolymer (EVA), melting point 79° C.(trademark: Ultrathene 635, Toso)
  A3: ethylene-ethyl acrylate copolymer (EEA), melting point 79° C.(trademark: EVAFLEX A-714, Du Pont-Mitsui Polychemicals Company, Ltd.)
Component B (Polymer Alloy Containing an Ethylene Component and a Propylene Component)

B1: CATALLOY KS-353P (trademark, Montell SKD Sunrise Ltd.)
  B2: CATALLOY KS-021P (trademark, Montell SKD Sunrise Ltd.)
  B3: CATALLOY C200F (trademark, Montell SKD Sunrise Ltd.)
The dynamic storage moduli (E') at 23° C., 80° C. and 120° C. of the above-mentioned B1–B3 are as follows:
  B1 (23° C.: 210 MPa, 80° C.: 52 MPa, 120° C.: 21 MPa)
  B2 (23° C.: 294 MPa, 80° C.: 125 MPa, 120° C.: 59 MPa)
  B3 (23° C.: 303 MPa, 80° C.: 65 MPa, 120° C.: 20 MPa)
Component C (Inorganic Metal Compound)
  C1: magnesium hydroxide ($Mg(OH)_2$, untreated) (trademark: Magshizu N-0, Konoshima Chemical Industrial Co., Ltd.)
  C2: magnesium hydroxide ($Mg(OH)_2$, treated with stearic acid) (trademark: Magshizu N-3, Konoshima Chemical Industrial Co., Ltd.)
  C3: magnesium hydroxide ($Mg(OH)_2$, treated with stearic acid) (trademark: FINEMAG SN-T, TMG)
  C4: magnesium hydroxide ($Mg(OH)_2$, treated with oleic acid) (trademark: FINEMAG SN-L, TMG)
  C5: magnesium hydroxide ($Mg(OH)_2$, treated with silane coupling agent) (trademark: KISUMA 5NH, Kyowa Chemical Industry Co., Ltd.)
  C6: magnesium hydroxide ($Mg(OH)_2$, treated with silane coupling agent) (trademark: KISUMA 5LH, Kyowa Chemical Industry Co., Ltd.)
  C7: magnesium hydroxide ($Mg(OH)_2$, treated with silane coupling agent) (trademark: KISUMA 5PH, Kyowa Chemical Industry Co., Ltd.)
  C8: carbon black (trademark: Shisuto 3H, TOKAI CARBON CO., LTD.)
Preparation of Substrate and Adhesive Tape The above-mentioned Component A, Component B and Component C were dry blended, kneaded in a pressurized 3L kneader at 180° C. and pelleted. The composition was formed into a 3 mm thick film by a press machine and the oxygen index was measured. The composition was then formed into a 0.2 mm thick film by a calendar rolling machine to give a substrate. One side surface of the substrate was subjected to a corona discharge treatment and an acrylic adhesive prepared by the following method was applied (thickness 30 μm) to give an adhesive tape. This tape was subjected to a tensile test and a thermal deformation test.
Preparation of Acrylic Adhesive In a reaction vessel equipped with a condenser, a nitrogen inlet, a thermometer and a stirrer were placed, in a toluene solvent, 2-ethylhexyl acrylate (100 parts by weight), acrylic acid (2 parts by weight), and benzoyl peroxide (0.2 part by weight) as a polymerization initiator, and the mixture was allowed to react at 60° C. for 8 hours to give a polymer. To this polymer solution was added a polyisocyanate crosslinking agent (trademark: CORONATE L, NIPPON POLYURETHANE INDUSTRY CO., LTD., 3 parts by weight per 100 parts by weight of the polymer solid content) to give an acrylic adhesive.

EXAMPLES 1–9

From Component A, Component B and Component C of the materials and amounts shown in the following Table 1, a substrate (adhesive tape) was prepared according to the above-mentioned forming method.

COMPARATIVE EXAMPLE 1

Using Component A (A1: 100 parts by weight) but without using Component B or Component C, a substrate (adhesive tape) was prepared according to the above-mentioned forming method.

COMPARATIVE EXAMPLE 2

Using Component A (A2: 100 parts by weight) but without using Component B or Component C, a substrate (adhesive tape) was prepared according to the above-mentioned forming method.

COMPARATIVE EXAMPLE 3

Using Component A (A3: 100 parts by weight) but without using Component B or Component C, a substrate (adhesive tape) was prepared according to the above-mentioned forming method.

COMPARATIVE EXAMPLE 4

Using Component B (B1: 100 parts by weight) but without using Component A or Component C, a substrate (adhesive tape) was prepared according to the above-mentioned forming method.

COMPARATIVE EXAMPLE 5

Using polypropylene (PP) (100 parts by weight, trademark: NOVATEC FX3, Japan Polychem Corporation) but without using Component A, Component B or Component C, a substrate (adhesive tape) was prepared according to the above-mentioned forming method.

COMPARATIVE EXAMPLE 6

Using Component A (A1: 100 parts by weight) and Component C (C2: 50 parts by weight, C8: 2 parts by weight) but without using Component B, a substrate (adhesive tape) was prepared according to the above-mentioned forming method.

COMPARATIVE EXAMPLE 7

Using Component A (A1: 100 parts by weight) and Component C (C2: 100 parts by weight, C8: 2 parts by weight) but without using Component B, a substrate (adhesive tape) was prepared according to the above-mentioned forming method.

COMPARATIVE EXAMPLE 8

Using Component B (B1: 100 parts by weight) and Component C (C5: 150 parts by weight, C8: 4 parts by weight) but without using Component A, a substrate (adhesive tape) was prepared according to the above-mentioned forming method.

COMPARATIVE EXAMPLE 9

Using Component A (A1: 50 parts by weight), Component C (C2: 100 parts by weight, C8: 2 parts by weight), polypropylene (15 parts by weight, trademark: NOVATEC FX3, Japan Polychem Corporation) and ethylene-propylene rubber (EPR) (35 parts by weight, trademark: SPO VO-141, Sumitomo Chemical Company, Limited), but without using Component B, a substrate (adhesive tape) was prepared according to the above-mentioned forming method.

COMPARATIVE EXAMPLE 10

Using Component A (A1: 30 parts by weight), Component B (B1: 70 parts by weight) and Component C (C1: 100 parts by weight, C8: 2 parts by weight, a substrate (adhesive tape) was prepared according to the above-mentioned forming method.

COMPARATIVE EXAMPLE 11

Using Component A (A1: 20 parts by weight), Component B (B1: 80 parts by weight) and Component C (C1: 150 parts by weight, C8: 2 parts by weight, a substrate (adhesive tape) was prepared according to the above-mentioned forming method.

COMPARATIVE EXAMPLE 12

Using Component A (A1: 20 parts by weight), Component B (B1: 80 parts by weight) and Component C (C2: 150 parts by weight, C8: 4 parts by weight, a substrate (adhesive tape) was prepared according to the above-mentioned forming method.

COMPARATIVE EXAMPLE 13

Using Component A (A1: 20 parts by weight), Component B (B1: 80 parts by weight) and Component C (C3: 150 parts by weight, C8: 4 parts by weight, a substrate (adhesive tape) was prepared according to the above-mentioned forming method.

COMPARATIVE EXAMPLE 14

Using Component A (A1: 20 parts by weight), Component B (B1: 80 parts by weight) and Component C (C4: 150 parts by weight, C8: 4 parts by weight, a substrate (adhesive tape) was prepared according to the above-mentioned forming method.

Evaluation Test

The substrates (adhesive tapes) of Examples 1–9 and Comparative Examples 1–14 were subjected to the following evaluation tests. The dynamic storage moduli (E') at 80° C. and 120° C. of the adhesive tape were measured by the aforementioned method.

(i) Evaluation of Flame Resistance

At the step of forming into a 3 mm thick sheet using a press machine during the formation of the aforementioned substrate, a test piece (size:length 70 mm, width 6.5 mm) was taken from the sheet and this test piece was burnt according to the incineration test method of polymer material by the oxygen index method according to JIS K 7201 to examine if the test piece continued to burn for 3 minutes or longer. In addition, the amount of minimum oxygen flow necessary for continuous flame burning of not less than 50 mm thereof after flame burning, and the nitrogen flow at that time were measured by a flowmeter (Candle Type Flammability Tester, TOYO SEIKI SEISAKU-SHO Co., Ltd.). The oxygen index was calculated from the following formula (I) and the flame resistance was evaluated based on the oxygen index. The oxygen index of not less than 25% was an acceptance value and less than 25% was a rejection value for flame resistance.

$$\text{Oxygen index (O.I.)} = \{[O_2]/([O_2]+[N_2])\} \times 100 \quad (I)$$

wherein $[O_2]$ is an oxygen flow (l/min) and $[N_2]$ is a nitrogen flow (l/min).

(ii) Evaluation of Strength at Break and Elongation at Break

A test piece (width 19 mm, length 100 mm) taken from an adhesive tape is held at both ends in the length direction thereof at 23° C., 60% RH, wherein the length direction is the direction of flow during forming a substrate (MD direction), and stretched at a tension speed of 300 mm/min in the length direction by a universal tensile compression tester to measure strength at break (MPa) and elongation at break (%). A strength at break of not less than 9 MPa and not more than 25 MPa was a pass and an elongation at break of not less than 100% and less than 400% was a pass.

The judgment of the pass or not pass was made upon evaluation of the relationship between actual winding workability of the adhesive tape around an object, and the strength at break and elongation at break, wherein it was confirmed that, when the strength at break and elongation at break were within the above-mentioned ranges, the adhesive tape could be wound while stretching it easily without suffering from the breakage of the adhesive tape, and that, after winding, the adhesive tape could be cut easily with hand.

To be specific, when the strength at break is less than 9 MPa, the adhesive tape often gets broken during winding of the adhesive tape, and when it exceeds 25 MPa, the adhesive tape after winding is difficult to cut with hand. When the elongation at break is less than 100%, since the adhesive tape does not easily stretch, the workability during the winding of the adhesive tape is degraded, and when it is over 400%, the adhesive tape gets too stretched, which in turn causes degraded workability during the winding of the adhesive tape and unfeasible cutting of the adhesive tape with hand after winding.

(iii) Evaluation of Thermal Deformation

Figure 1A:
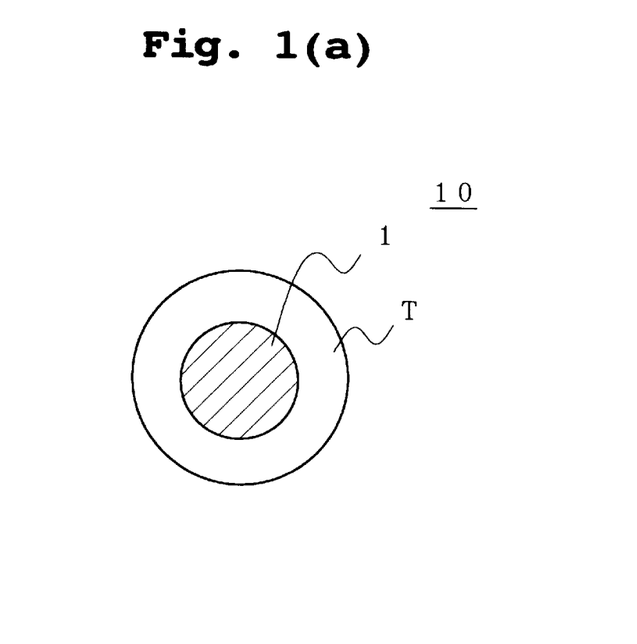
FIG. 1(a) is a side view of the test sample.
Figure 1B:
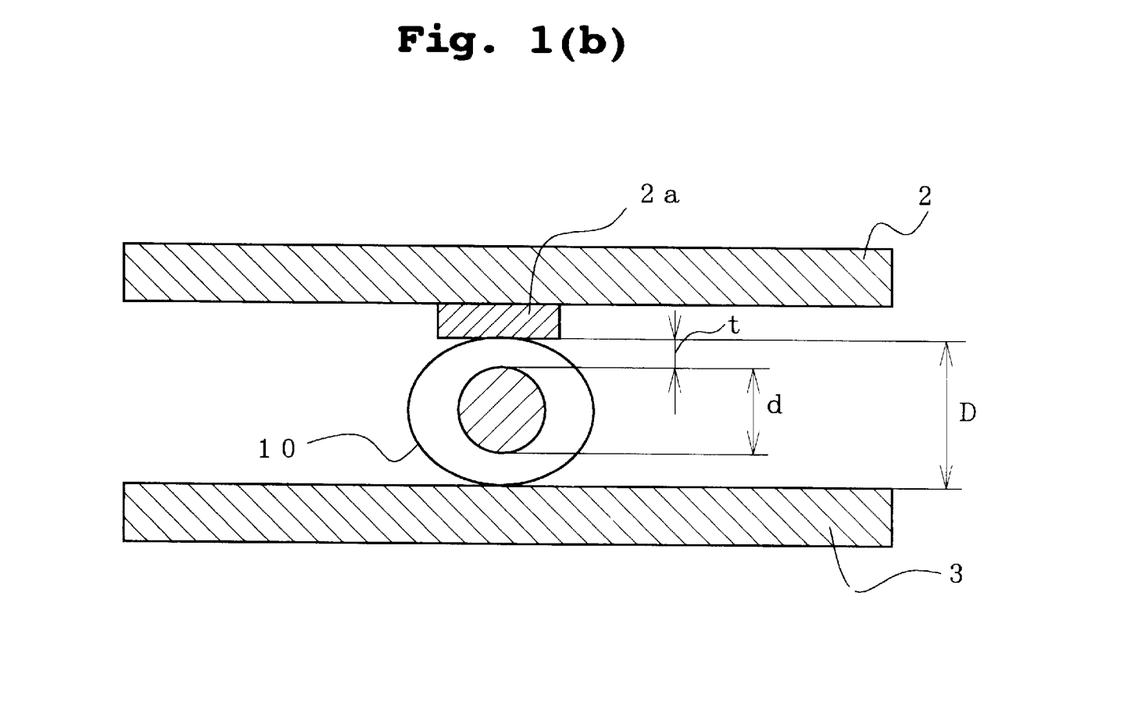
FIG. 1(b) is a side view of a test apparatus, 1 is a round bar, 2 is a loading plate, 2a is a convex, 3 is a parallel plate, 10 is a test sample and T is an adhesive tape.

Measured according to UL-510. As shown in FIG. 1(a), an adhesive tape T is wound around a round conductor bar 1 having a diameter (d) of 2 mm and a length of 30 mm to prepare a test sample 10. The outer diameter (D0) of the test sample 10 at normal temperature is measured with a dial gauge defined in JIS B 7503, vernier calipers defined in JIS B 7507, or a measurement tool having the same degree of measurement precision. The test sample 10 is placed in a tester heated to a predetermined temperature (100° C.±1.0° C.) and heated for 60 minutes. The test sample 10 is placed between a loading plate 2 having a columnar convex 2a having a diameter of 9.5±0.2 mm and a parallel plate 3, as shown in FIG. 1(b), pressurized (4.9 N) from the vertical direction of the planar surface of the plates and left standing at a predetermined temperature (100° C.±1.0° C.) for 60 minutes. The test sample is measured for the outer diameter (D1) in situ. The thickness (t0) before heating the tape and the thickness (t1) after heating the tape are calculated from the following formula (II). The in the thickness (thermal deformation (X)) of the tape is calculated from the following formula (III). The thermal deformation rate X of not more than 65% was a pass and that over 65% was a failure:

$$t=(D-d)/2 \tag{II}$$

wherein D is an outer diameter of the test sample and d is a diameter of the round bar, $$X(\%)=\{(t0-t1)/t0\}\times 100 \tag{III}$$

wherein t0 is a thickness (mm) before heating and t1 is a thickness (mm) after heating.

(iv) Evaluation of Resistance to Whitening of the Surface

<Resistance to Surface Whitening During stretching>

Test pieces (width 19 mm) obtained from the adhesive tape were stretched 50% at 23° C., 60% RH and the whitening of the surface of the substrate was visually observed. Those free of whitening were taken as a pass (○) and those associated with whitening were taken as a failure (X).

Figure 2A:
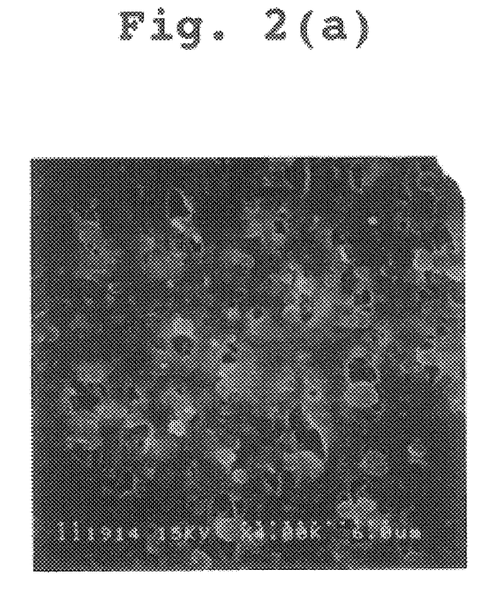
FIG. 2(a) shows Comparative Example 12 (whitened) and FIG. 2(b) shows Example 1 (not whitened).
Figure 2B:
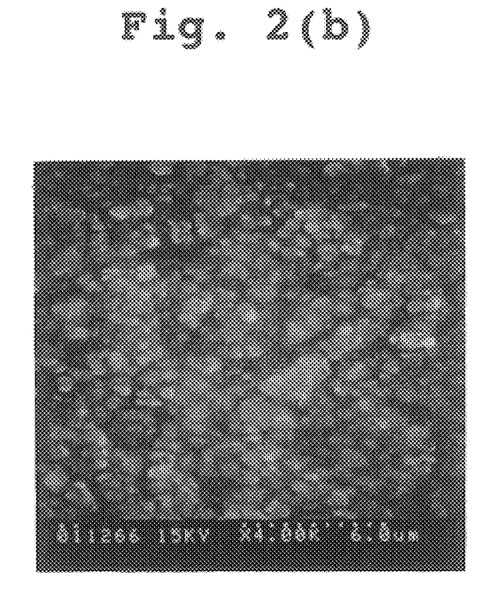

The state of the surface of the substrate after stretching was observed with a scanning electron microscope (magnification×4000). The whitened piece as shown in the photograph in FIG. 2(a) (Comparative Example 12) contained voids (dark part in the photograph) due to an insufficient interface binding force between the resin component and the inorganic metal compound. As a result, light scattering varied to make the tape whitened upon visual observation. In contrast, the non-whitened piece as shown in the photograph in FIG. 2(b) (Example 1) contains no voids as a result of the sufficient interface binding force between the resin component and the inorganic metal compound. This has a consequence that no voids are formed in the interface and that no variation in the light scattering is caused, as a result of which the tape is not whitened upon visual observation.

<Resistance to Surface Whitening During Scratching (Contact With Objects)>

The respective materials for a substrate were kneaded to give pellets. They were formed into a sheet having the size of thickness 1 mm, length 150 mm and width 180 mm by a heat press and test pieces (width 20 mm, length 100 mm) were punched out. The surface of these test pieces was scratched with a needle abrasion tester at a load of 500 g according to the MIL standard W-22759D. The surface of the test pieces was visually observed. Those free of whitening were taken as a pass (○) and those associated with whitening were taken as a failure (X).

These evaluation results and the dynamic storage moduli (E') at 80° C. and 120° C. of the adhesive tape are shown in the following Table 1.

TABLE 1

| | Component A | | Component B | | Component C | | C8 | Strength at break (MPa) | Elongation at break (%) | Thermal deformation (%) | Dynamic storage modulus (E')(MPa) | | Oxygen index (%) | Resistance to surface whitening | |
|---|---|---|---|---|---|---|---|---|---|---|---|---|---|---|---|
| | Kind | Amount added | Kind | Amount added | Kind | Amount added | Amount added | | | | 80° C. | 120° C. | | upon stretch | Upon scratch |
| Ex.1 | A1 | 20 | B1 | 80 | C5 | 170 | 4 | 14 | 230 | 18 | 63 | 24 | 31 | ○ | ○ |
| Ex.2 | A1 | 50 | B1 | 50 | C5 | 160 | 4 | 13 | 280 | 32 | 62 | 23 | 33 | ○ | ○ |
| Ex.3 | A1 | 40 | B1 | 60 | C6 | 150 | 4 | 12 | 180 | 30 | 66 | 23 | 32 | ○ | ○ |
| Ex.4 | A1 | 40 | B1 | 60 | C7 | 150 | 4 | 12 | 180 | 30 | 66 | 23 | 32 | ○ | ○ |
| Ex.5 | A2 | 20 | B1 | 80 | C5 | 150 | 4 | 15 | 250 | 19 | 42 | 20 | 30 | ○ | ○ |
| Ex.6 | A2 | 20 | B3 | 80 | C6 | 150 | 4 | 14 | 280 | 19 | 45 | 21 | 31 | ○ | ○ |
| Ex.7 | A1 | 30 | B2 | 70 | C5 | 100 | 2 | 12 | 340 | 30 | 140 | 60 | 25 | ○ | ○ |
| Ex.8 | A1 | 30 | B1 | 70 | C6 | 100 | 2 | 14 | 370 | 30 | 48 | 11 | 25 | ○ | ○ |
| Ex.9 | A3 | 40 | B1 | 60 | C5 | 150 | 4 | 10 | 380 | 30 | 31 | 13 | 30 | ○ | ○ |
| Com.Ex.1 | A1 | 100 | | | | | | 24 | 720 | 100 | 11 | X | 20 | x | ○ |

TABLE 1-continued

| | Component A | | Component B | | Component C | | C8 Amount added | Strength at break (MPa) | Elonga- tion at break (%) | Thermal defor- mation (%) | Dynamic storage modulus (E')(MPa) | | Oxygen index (%) | Resistance to surface whitening | |
|---|---|---|---|---|---|---|---|---|---|---|---|---|---|---|---|
| | Kind | Amount added | Kind | Amount added | Kind | Amount added | | | | | 80° C. | 120° C. | | upon stretch | Upon scratch |
| Com.Ex.2 | A2 | 100 | | | | | | 28 | 750 | 100 | 11 | ✖ | 20 | x | o |
| Com.Ex.3 | A3 | 100 | | | | | | 13 | 780 | 100 | 11 | ✖ | 20 | x | o |
| Com.Ex.4 | | | B1 | 100 | | | | 23 | 820 | 19 | 52 | 21 | 18 | x | o |
| Com.Ex.5 | | | PP | 100 | | | | 28 | 630 | 5 | 214 | 42 | 17 | x | o |
| Com.Ex.6 | A1 | 100 | | | C2 | 50 | 2 | 20 | 760 | 100 | 12 | ✖ | 22 | x | x |
| Com.Ex.7 | A1 | 100 | | | C2 | 100 | 2 | 12 | 610 | 100 | 17 | ✖ | 25 | x | x |
| Com.Ex.8 | | | B1 | 100 | C5 | 150 | 4 | 6 | 360 | 8 | 154 | 34 | 28 | x | x |
| Com.Ex.9 | A1 | 50 | PP | 15 | C2 | 100 | 2 | 4 | 40 | 100 | 29 | ✖ | 26 | x | x |
| | | | EPR | 35 | | | | | | | | | | | |
| Com.Ex.10 | A1 | 30 | B1 | 70 | C1 | 100 | 2 | 6 | 130 | 30 | 42 | 11 | 24 | x | x |
| Com.Ex.11 | A1 | 20 | B1 | 80 | C1 | 150 | 2 | 6 | 70 | 22 | 66 | 16 | 26 | x | x |
| Com.Ex.12 | A1 | 20 | B1 | 80 | C2 | 150 | 4 | 6 | 260 | 24 | 75 | 25 | 28 | x | x |
| Com.Ex.13 | A1 | 20 | B1 | 80 | C3 | 150 | 4 | 9 | 590 | 24 | 68 | 13 | 28 | x | x |
| Com.Ex.14 | A1 | 20 | B1 | 80 | C4 | 150 | 4 | 8 | 590 | 28 | 70 | 13 | 30 | x | x |

In the Table, the amounts of Component A, Component B and Component C are in parts by weight, and ✖ means that the adhesive tape (substrate) was melted and the dynamic storage modulus (E') could not be measured. The thermal deformation of 100% means that an adhesive tape was melted and dropped from the round bar, thus failing to maintain the shape of a tape. The polypropylene (PP) and ethylene-propylene rubber (EPR) used in Comparative Examples 5 and 9 is conveniently listed in the column of Component B.

As is evident from the foregoing explanation, the substrate for an adhesive tape of the present invention contains Components A, B and C, but substantially no halogen atom. Consequently, the adhesive tape is superior in flexibility, resistance to thermal deformation and flame resistance, as well as suitable in stretchability and mechanical strength, which in turn results in superior workability during winding of the adhesive tape around an object and hand cutting property after winding, and the absence of whitening of the surface during stretching of the adhesive tape. In addition, the tape is free of generation of dioxin and toxic gas, such as chlorine gas, upon incineration.

Therefore, the adhesive tape of the present invention can be sufficiently used as a substitute for an adhesive tape using a PVC substrate, which has been used as an insulating tape for electric equipment used in the fields of vehicles, such as automobile, train, bus and the like, aircraft, ship, house, plant and the like. Inasmuch as the inventive adhesive tape is free of generation of dioxin and toxic gas upon incineration and places less burden on the environment, it is highly valuable for use.

This application is based on a patent application Nos. 47332/2000 and 288673/2000 filed in Japan, the contents of which are hereby incorporated by reference.

What is claimed is:

1. An adhesive tape comprising a substrate and an adhesive layer formed on at least one side of the substrate, wherein the substrate comprises the following Component A, Component B and Component C but substantially no halogen atom:
   Component A: a thermoplastic resin having a carbonyl oxygen atom in the molecular skeleton
   Component B: a propylene/ethylene copolymer obtained by multi-step polymerization involving two or more steps
   Component C: an inorganic metal compound surface-treated with a silane coupling agent by dry treatment or wet treatment
   wherein the Component B has a dynamic storage modulus (E') at 23° C. of no less than 200 MPa and less than 400 MPa, and a dynamic storage modulus (E') at 80° C. of not less than 40 MPa and less than 180 MPa, and a dynamic storage modulus (E') at 120° C. of not less than 12 MPa and less than 70 MPa.

2. The adhesive tape of claim 1, wherein the Component A is an ethylene copolymer or a metal salt thereof, having a melting point of not more than 120° C., which is obtained by polymerizing a vinyl ester compound, or an α,β-unsaturated carboxylic acid or a derivative thereof, or the vinyl ester compound and the α,β-unsaturated carboxylic acid or a derivative thereof.

3. The adhesive tape of claim 1, wherein the Component C is an inorganic metal compound surface-treated with 0.1–5.0 wt % silane coupling agent per the weight of the inorganic metal compound.

4. The adhesive tape of claim 1, wherein the Component A and the Component B are mixed at a weight ratio (A:B) of 1:9–8:2, and the Component C is added in an amount of 80–200 parts by weight per 100 parts by weight of the total weight of the Component A and the Component B.

5. The adhesive tape of claim 1, which has a dynamic storage modulus (E') at 80° C. of not less than 25 MPa and a dynamic storage modulus (E') at 120° C. of not less than 10 MPa.

6. The adhesive tape of claim 1, wherein the substrate is not crosslinked during or after a forming process thereof.

7. A substrate for an adhesive tape, which comprises the following Component A, Component B and Component C but substantially no halogen atom:
   Component A: a thermoplastic resin having a carbonyl oxygen atom in the molecular skeleton
   Component B: a propylene/ethylene copolymer obtained by multi-step polymerization involving two or more steps
   Component C: an inorganic metal compound surface-treated with a silane coupling agent by dry treatment or wet treatment
   wherein the Component B has a dynamic storage modulus (E') at 23° C. of no less than 200 MPa and less than 400

MPa, and a dynamic storage modulus (E') at 80° C. of not less than 40 MPa and less than 180 MPa, and a dynamic storage modulus (E') at 120° C. of not less than 12 MPa and less than 70 MPa.

8. The substrate of claim 7, wherein the Component A is an ethylene copolymer or a metal salt thereof, having a melting point of not more than 120° C., which is obtained by polymerizing a vinyl ester compound, or an α,β-unsaturated carboxylic acid or a derivative thereof, or the vinyl ester compound and the α,β-unsaturated carboxylic acid or a derivative thereof.

9. The substrate of claim 7, wherein the Component C is an inorganic metal compound surface-treated with 0.1–5.0 wt % silane coupling agent per the weight of the inorganic metal compound.

10. The substrate of claim 7, wherein the Component A and the Component B are mixed at a weight ratio (A:B) of 1:9–8:2, and the Component C is added in an amount of 80–200 parts by weight per 100 parts by weight of the total weight of the Component A and the Component B.

11. The substrate of claim 7, which has a dynamic storage modulus (E') at 80° C. of not less than 25 MPa and a dynamic storage modulus (E') at 120° C. of not less than 10 MPa.

12. The substrate of claim 7, which is not crosslinked during or after a forming process thereof.

\* \* \* \* \*